United States Patent
Homeier et al.

[15] 3,651,924
[45] Mar. 28, 1972

[54] DUAL BEND CONVEYOR

[72] Inventors: Ronald F. Homeier, Plainfield; Larry E. Richardson, Indianapolis, both of Ind.

[73] Assignee: FMC Corporation, San Jose, Calif.

[22] Filed: June 15, 1970

[21] Appl. No.: 46,368

[52] U.S. Cl. ................................................. 198/189, 198/182
[51] Int. Cl. ........................................ B65g 15/00, B65g 17/00
[58] Field of Search ............... 198/181, 182, 137, 193, 194, 198/195, 189; 74/246; 104/172 C

[56] References Cited

UNITED STATES PATENTS

| | | | |
|---|---|---|---|
| 993,313 | 5/1911 | Merz | 198/189 |
| 2,768,733 | 10/1956 | Wilson | 104/172 C |

FOREIGN PATENTS OR APPLICATIONS

| | | | |
|---|---|---|---|
| 76,794 | 12/1954 | Netherlands | 198/181 |

*Primary Examiner*—Richard E. Aegerter
*Attorney*—F. W. Anderson and C. E. Tripp

[57] ABSTRACT

A conveyor capable of bending in vertical and horizontal planes having a central guide and drive chain capable of being driven in two planes and a continuous horizontal carrying surface comprised of multiple load supporting leaves on transverse rods carried by links of the drive chain for relative telescoping motion when the conveyor is bent in horizontal or vertical planes.

6 Claims, 11 Drawing Figures

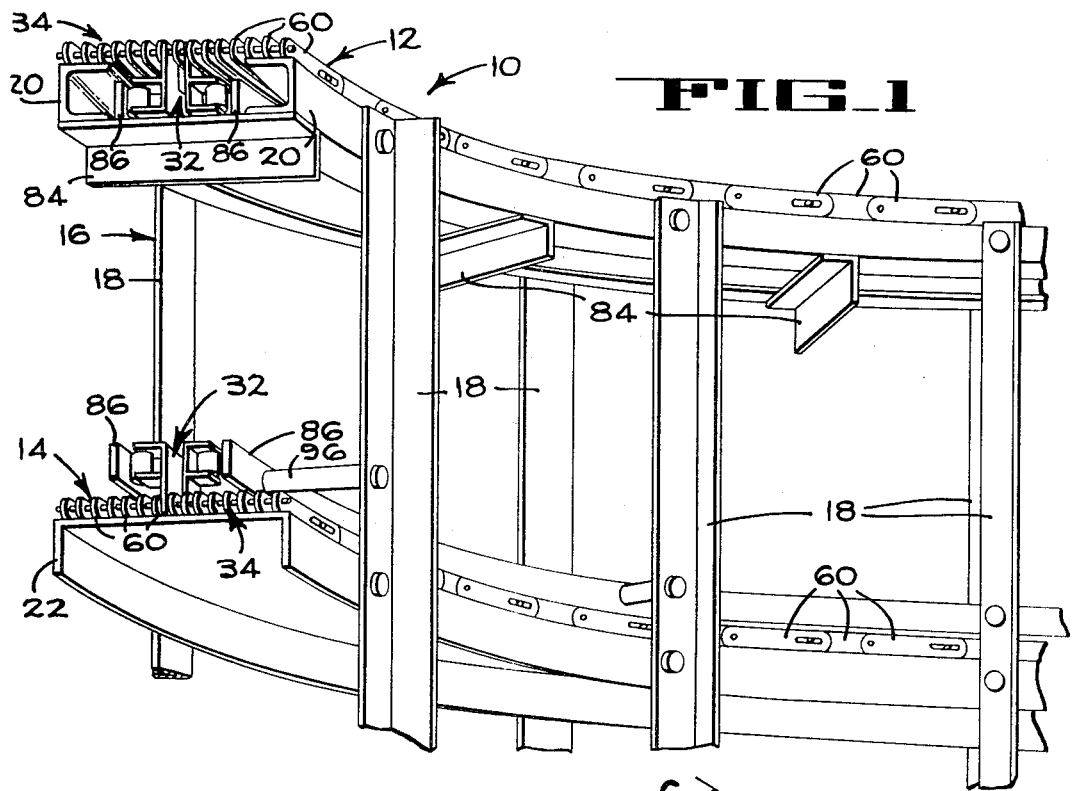
FIG_1
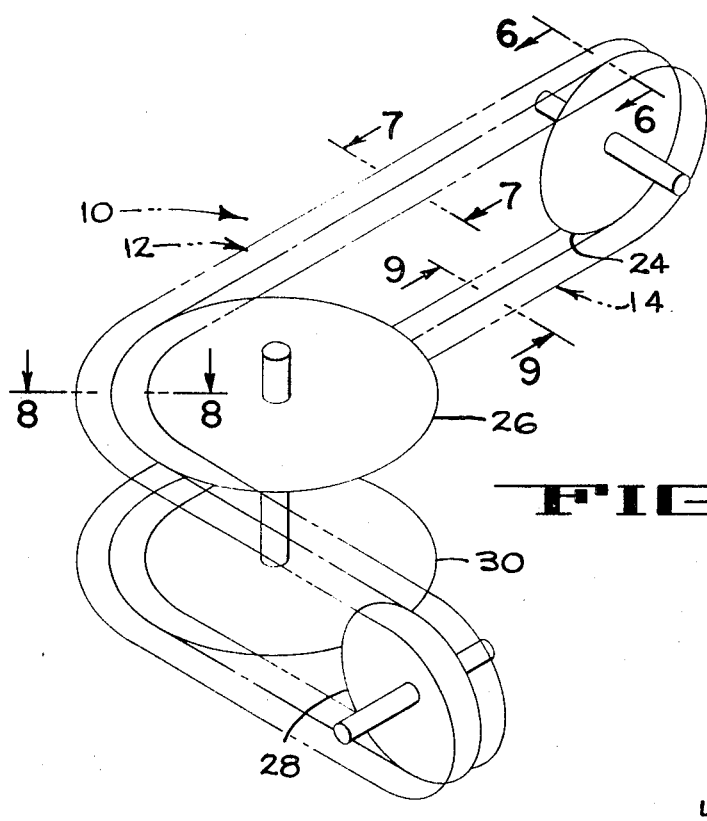
FIG_2
INVENTORS
RONALD F. HOMEIER
LARRY E. RICHARDSON
BY F. W. Anderson
C. E. Tripp
ATTORNEYS

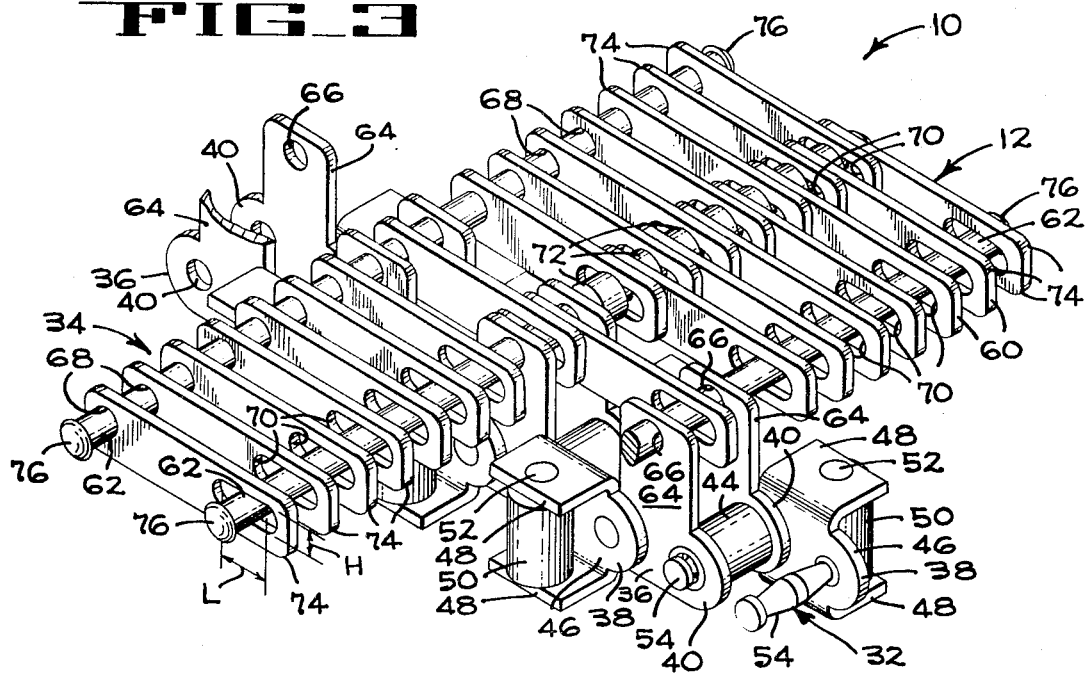
FIG_3
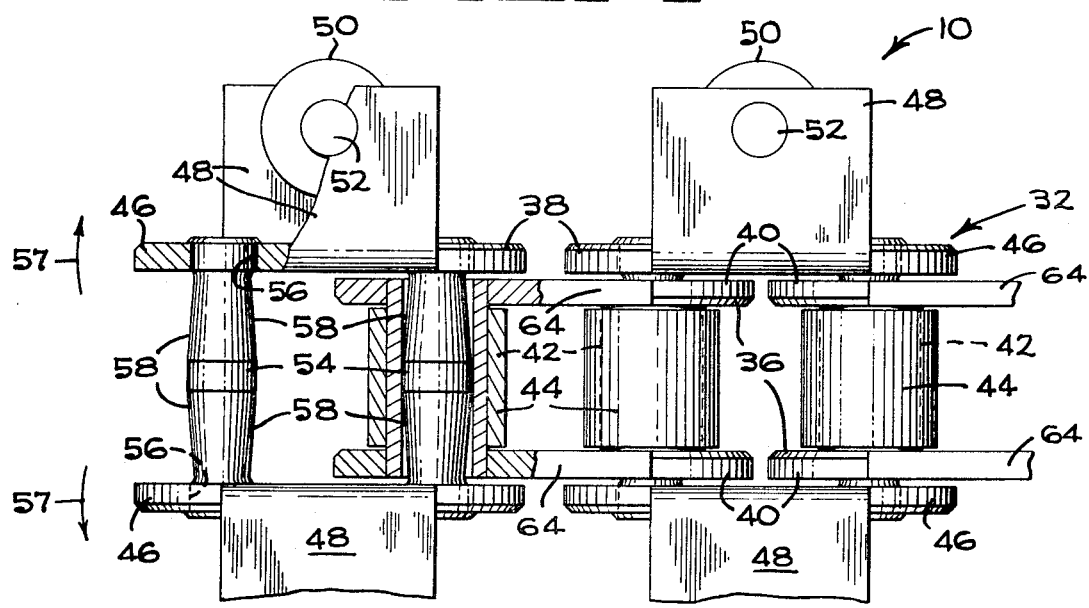
FIG_4

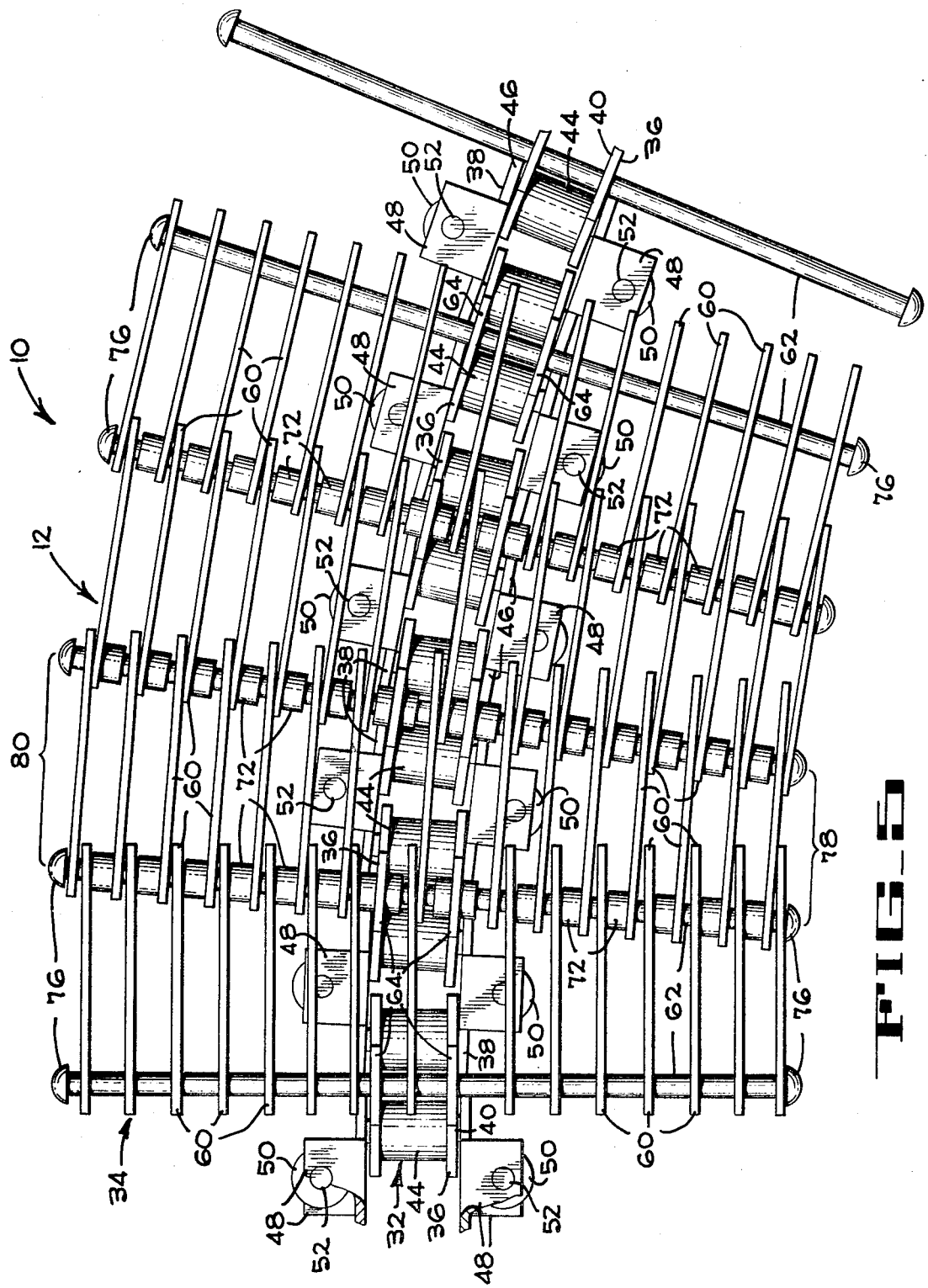

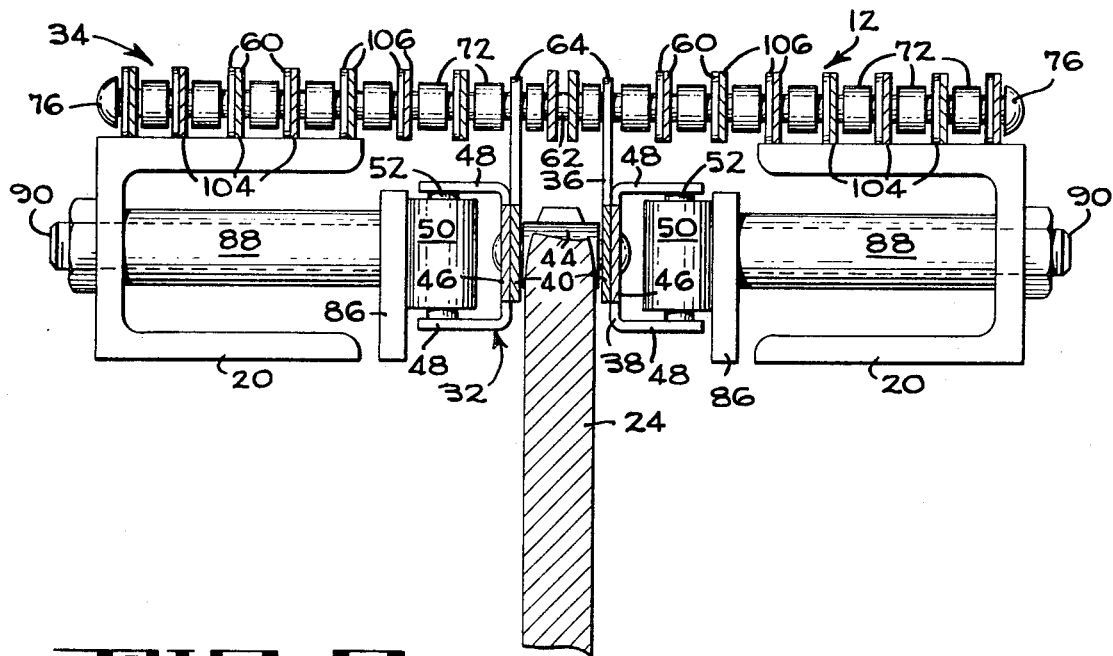
FIG_6
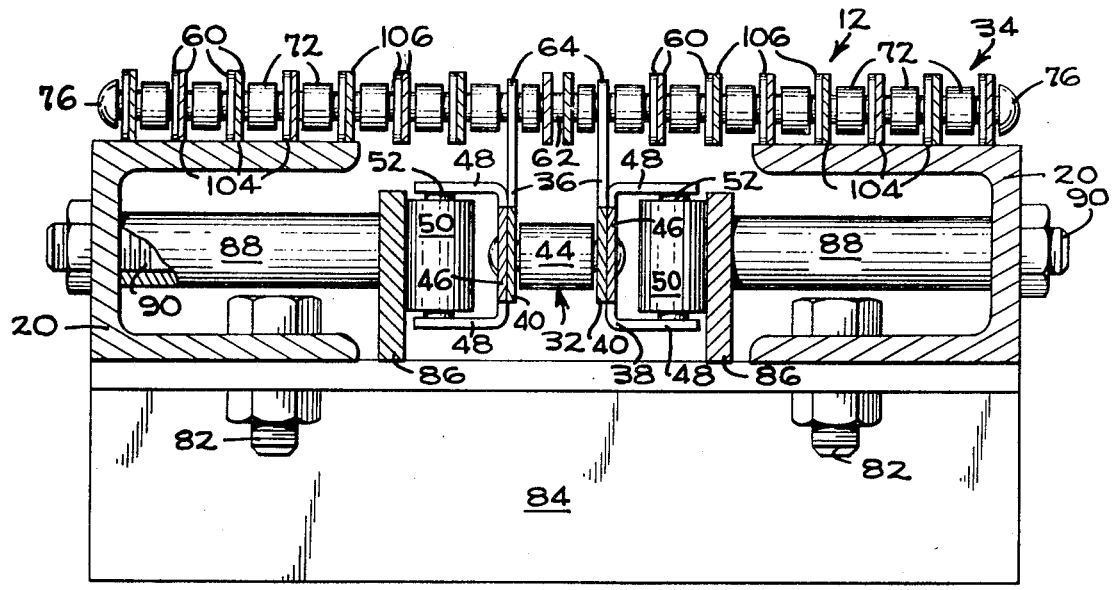
FIG_7

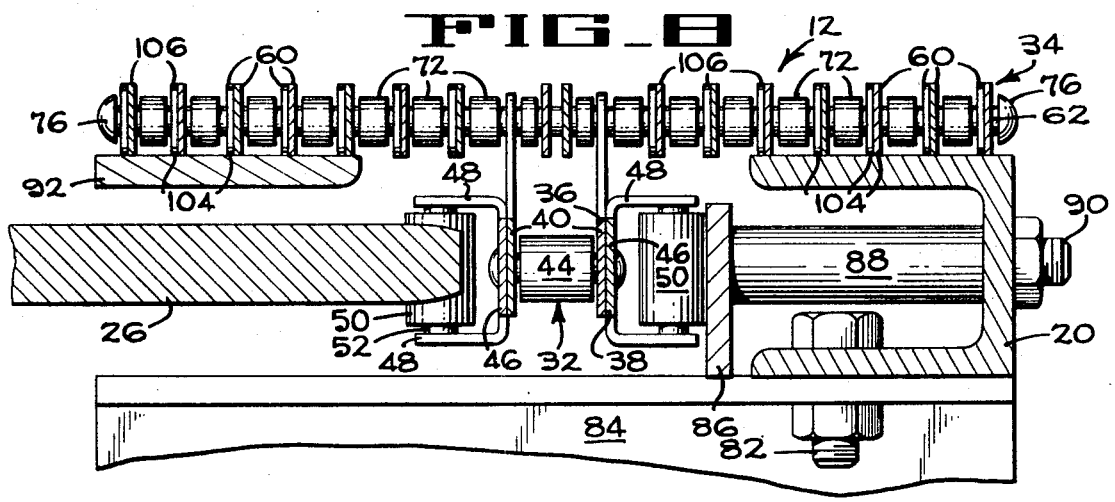
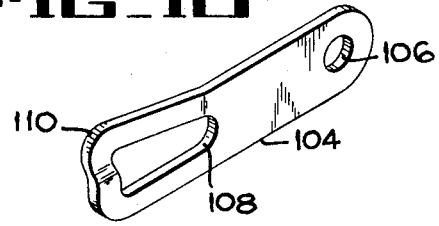
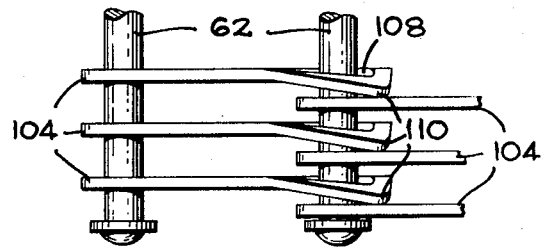

DUAL BEND CONVEYOR

BACKGROUND OF THE INVENTION

1. Field of the Invention

This invention relates to conveyors and in particular to conveyors that have a continuous carrying surface and are capable of bending in both horizontal and vertical planes.

2. Description of the Prior Art

Poerink U.S. Pat. No. 3,368,662 describes a conveyor belt comprising transverse rods having connecting links in the form of lamellas, thin plates, or wires. This conveyor is driven by dual spaced sprockets that engage the transverse rods.

Stuart et al. U.S. Pat No. 3,094,206 shows several forms of conveyors. The form most pertinent to the present invention is shown in FIGS. 11 and comprises a dual bend drive chain having U-shaped outwardly extending connecting links that mount horizontal and laterally extending support wires. The support wires form a noncontinuous conveying surface. As the conveyor is subjected to side bends, the spacing between the support wires is changed thereby limiting the minimum size of articles that can be carried without loss. Furthermore, the variation of spacing between the support wires of such a noncontinuous conveying surface renders it unsuitable for transporting tall cylindrical objects such as bottles.

Conveyors employing semi-circular meshing plate conveyor flights such as disclosed by U.S. Pat. Nos. to Dyson 2,157,283 and Davis 3,317,030 have serious limitations in that the articles conveyed must be centered on the flights to prevent spinning and upsetting of the articles when lateral bends are encountered.

SUMMARY OF THE INVENTION

The purpose of the present invention is to provide an improved conveyor having a continuous carrying surface capable of bending in both vertical and horizontal planes. This object is achieved by providing a flexible carrying band comprised of multiple, vertically oriented leaves that are telescopingly mounted on transverse support rods carried by a central guide and drive chain. As the conveyor is bent, the spacing between the support rods varies, being smaller on the inside of the bend and progressively larger toward the outside. The telescopingly mounted leaves, however, provide a continuous carrying surface while permitting relative movement of the support rods.

A further advantage of the improved conveyor is smoother motion or operation during motion through lateral bends. This is achieved by guiding the central driving chain in the bends and loosely attaching the flexible conveying band to the chain so that transmission of any shifting motions and vibration between drive chain and conveying band is minimized.

Another object is to provide a stronger chain having reduced wear characteristics. In the conveyor of the present invention the conveyor driving force and tension is carried by the central drive chain thereby eliminating transmission forces from the conveying band.

Another advantage resides in the dual function of the vertical side rollers. These rollers in addition to acting as guides, can also be driven by or idled around a horizontally oriented sprocket in lateral bends.

DESCRIPTION OF THE DRAWINGS

FIG. 1 is a perspective view of the conveyor of the present invention.

FIG. 2 is a diagrammatic perspective view of a typical conveyor path having horizontal and vertical turns.

FIG. 3 is a partial perspective view having portions broken away.

FIG. 4 is a plan view of the drive chain having portions broken away.

FIG. 5 is a plan view of the conveyor in a horizontal bend.

FIG. 6 is a cross section of the upper conveying run taken on line 6—6 of FIG. 2, illustrating engagement with a vertical sprocket.

FIG. 7 is a view similar to FIG. 6, taken on line 7—7 of FIG. 2.

FIG. 8 is a view similar to FIG. 6, taken on line 8—8 of FIG. 2, illustrating engagement with a horizontal sprocket.

FIG. 9 is a cross section of the lower return run taken on line 9—9 of FIG. 2.

FIG. 10 is an enlarged perspective view of a modified form of the offset leaf.

FIG. 11 is a partial plan view illustrating the mounting of the modified form of leaf shown in FIG. 10.

DESCRIPTION OF THE INVENTION

Referring to FIG. 1, the conveyor of the present invention is generally indicated at 10 with an upper conveying run 12 and a lower return run 14. The conveyor is supported by means of a frame 16 that includes multiple uprights 18 to which upper and lower ways 20 and 22 are secured.

As previously stated, the purpose of the invention is to provide an improved conveyor capable of bending or turning in two different planes. In FIG. 2, the conveyor 10, as indicated schematically in phantom line, is trained about a vertical chain sprocket 24. The upper conveyor run 12 is guided in a lateral bend by means of a horizontal sprocket 26. After completion of the lateral bend, the conveyor then passes around a vertical sprocket 28 and becomes the lower return run 14. It then makes a lateral bend about sprocket 30, located directly beneath sprocket 26, thereafter extending to the previously mentioned vertical sprocket 24.

By means of the exemplary schematic of FIG. 2, the flexibility of the conveyor 10 of the present invention to permit lateral as well as vertical turns or bends is clearly shown. It will be apparent that many different conveyor path configurations can be formed by such a conveyor in which horizontal as well as vertical bends are accommodated, however, it is quite feasible to use a conveyor such as of the present invention in forming entirely horizontal conveyor paths formed only of lateral or horizontal bends.

With reference to FIGS. 3, 4 and 5 the detail construction of the conveyor 10 will now be explained.

The dual bend conveyor 10 is basically comprised of two elements; a central guide and drive chain 32 and a continuous flexible conveying band 34. The guide and drive chain 32 of the conveyor, as best seen in FIGS. 3 and 4, comprises multiple roller links 36 that are joined by connecting or pin links 38. Each roller link 36 includes a pair of inside link plates 40 spaced by means of bushings 42 that extend therebetween and are securely fitted to the link plates. These bushings extend through the inside link plates 40. In addition to joining the inside link plates the hollow bushings 42 further act as an axle for mounting rotatable rollers 44 between the link plates.

The connecting or pin links 38 have an outside link plate 46 that includes a pair of laterally outward extending brackets 48 between which a vertically oriented side roller 50 is rotatably retained by a pin 52 fixed to the legs.

The roller links 36 are joined to form a continuous chain by means of horizontal pins 54 that extend through the center of the hollow bushings 42 and which further extend through apertures 56 in the outside link plate portions 46 of the connecting links 38. As best seen in FIG. 4, the pins 54 extend through the outside link plate portions 46 and are swaged or riveted over so that they remain in position. These pins may also be retained by means of counter pins or spring clips or other similar devices well known in the art of roller chain manufacture. It will be appreciated that there is sufficient clearance between the pin 54 and the inside of the hollow bushing 42 to permit relative rotation between these parts thereby permitting flexing of the drive chain 32 in a vertical plane which is common characteristic of all roller chains.

The pins 54 however also permit flexure of this chain in a horizontal plane as indicated by arrows 57. This additional degree of flexibility is provided by tapering the pins 52 so that the diameter of the pin decreases equally for increasing distances from either side of the center of the pin as indicated at 58. The portion of the pin 54 which extends through the outside link plate portions 46, however, is maintained at the maximum pin diameter which closely corresponds to the diameter of aperture 56. This permits secure mounting of the pin 54 to the outside link plates 46 and prevents excessive slack and take-up between the pin and side plate of the connector links thereby eliminating or minimizing a possible telescoping action of the drive chain. It will be apparent that the tapered surfaces 58 of the horizontal connecting pins 54 permit a relative tilting motion between the connecting links 38 and the roller links 36 permitting the drive chains 32 to be bent in a horizontal plane indicated by directional arrows 57 as well as pivoting about the pins 52 in a vertical plane.

The continuous flexible conveying band 34 is comprised of multiple leaves 60 that are mounted between a plurality projection transverse rods 62, as best seen in FIGS. 3 and 5. Each of the rods 62 is carried by an individual roller link 36 of the guide and drive chain 32. In particular, the previously described roller links 36 further include vertical upstanding tabs 64 on each of their inside link plates 40. Each pair of tabs 64 have aligned apertures 66 (FIG. 3) in which one of the transverse rods 62 is carried as retained in a position normal to the path of the chain. The apertures 66 are of sufficiently greater diameter than the diameter of the rods 62 so that the rods are free to rotate about their longitudinal axes and are also free to slide laterally with respect to the roller links 36.

The multiple load carrying leaves are best seen in FIG. 3. Each of the multiple leaves 60 is formed from plate stock and includes a round rod receiving aperture 68 at one end and a slotted or elongate aperture 70 at the other. The round aperture 68 is of sufficient diameter to permit free lateral sliding motion between the leaves 60 and the rods 62. The height and length of the elongate slots 70, as indicated at H and L respectively in FIG. 3, permit longitudinal telescoping or sliding motion between the leaves 60 and rods 62, in addition to permitting lateral sliding motion of the rods 62. In order to maintain a relatively uniform lateral spacing between the multiple leaves 60, spacers 72 are inserted between adjacent pairs of leaves on each rod as can best be seen in FIG. 5. Offset links replacing multiple leaves 60 and spacers 72 may also be used to facilitate proper spacing.

Preferably, the leaves are assembled on the rods 62 as seen in FIG. 3 such that the leaves in one transverse row are assembled in such a manner that all of the round apertures are on one rod 62 and the elongate apertures on the adjacent rod. However, the flexibility of the conveying band would not be seriously affected the apertures were reversed or alternated when mounted on a common rod. In order to prevent possible jamming between the conveyor surface formed by the multiple leaves 60 and any supporting ways or articles carried on top of the conveyor, each of the corners 74 of the leaves are rounded. After the transverse rods 62, spacers 72 and multiple leaves 60 have been properly inserted and assembled on the upstanding tabs 64 of the roller links 36, the ends of the rods 62 are riveted over such as indicated at 76 thereby retaining the links 60 on the rods.

When the conveyor is in its normal or straight position the rods 62 are positioned centrally in the slots or elongate apertures 70 as best seen in FIG. 3. When the conveyor is bent in a vertical plane such as about sprockets 24 and 28 as seen in FIG. 2, the spacing between transverse rods increases as the drive chain is driven through a vertical bend due to the increased radius from the center of the vertical sprocket. While the spacing between the rods 62 increases due to the pivoting action of the roller links 40 about their transverse connecting pins 52, the transverse longitudinal axes of the rods 62 remain parallel to one another.

When the conveyor is subjected to a lateral or side bend as seen in FIG. 5, the transverse rods 62 always remain perpendicular to the roller links 36 upon which they are mounted. The ends of the rods 62 toward the inside of the band are closer together as indicated at 78 than their minimal spacing at the central drive chain 32 and their outside ends are spaced further apart as shown at 80. The slots or elongated apertures 70 in the multiple leaves 60 permit a relative telescoping action between adjacent transverse rods 62 and adjacent leaves 60. Due to the telescoping action of the leaves 60, the improved conveyor provides a continuous surface for carrying articles and the variation in spacing between the rods 62 during bends does not affect the continuity of the conveying surface so formed.

The manner in which the conveyor is supported, guided, and driven is best shown in FIGS. 6 and 9. Referring first to FIG. 7, which is a typical cross-section of a straight portion of the upper conveying run 12, it is seen that the flexible conveying band 34 is vertically supported from below by the upper ways 20. These ways 20 are formed by opposed U-shaped channels that are secured by means of bolts 82 to transversely oriented angle sections 84 spaced at intervals along the conveyor run. The guide and drive chain portion 32 of the conveyor extends downwardly between these opposed ways and the vertical side rollers 50 on either side of the chain engage vertically oriented guide rails 86. These rails 86, which serve to laterally orient the conveyor, are spaced from the ways 20 by means of a spacer tube 88 and are secured to the ways 20 by means of a counter-sunk flat head machine screws 90 that extend therethrough and are bolted to the side walls of the way 20. When it is desired to bend the conveyor in a vertical plane such as at one end of a conveying run, the conveyor supporting ways 20 and guides 86 are terminated as seen in FIG. 6. The drive chain portion 32 of the conveyor then engages and is trained about a vertically oriented sprocket 24. The rollers 44 of the roller links 36 engage the sprocket 24 in a manner common to roller chains. Upon completion of a 180° turn the conveyor is now in its lower return run 14 and is supported as seen in FIG. 9.

The conveyor can be guided and supported through lateral bends as illustrated in FIG. 8. The construction of the supporting way 20 and guide 86 on the outside of the band (right side of FIG. 8) is identical to the conveyor support structure of FIG. 7, except that the way and guide are now curved. The inside way is removed and replaced on a curved plate 92 of similar dimension which now supports the conveying band portion 34 of the upper run 12 of the conveyor. The horizontally oriented sprocket 26 passes beneath the support plate 92 and projects inwardly toward the drive and guide chain 32; engaging the vertical side rollers 50. As the conveyor progresses around the lateral bend, the drive and guide chain 32 is laterally restrained between the sprocket 26 and the vertical guide 86, smoothly guiding and laterally confining the drive chain as the conveyor progresses around a lateral bend. The horizontally oriented sprocket 26 may be employed either as an idler serving merely to guide the conveyor or may be employed to drive the conveyor, depending on the requirements of a particular conveyor path or configuration.

The conveyor may also be guided through lateral bends as shown in FIG. 1. In this manner of supporting the upper and lower runs of the conveyor through lateral bends, the construction of the supporting structure and ways does not vary from the construction shown in FIG. 7, except that the ways 20 and guides 86 are curved to achieve the lateral bend radius desired.

A typical section of the lower or return run 14 of the conveyor is seen in FIG. 9. In the lower return run, the conveyor is laterally guided in an inverted position as shown by means of vertical guides 94 that are attached to the uprights 18 by means of hollow spacer tubes 96 and machine screws 98 in a manner similar to that shown at FIG. 7. The conveyor is vertically supported by means of a single way 22 that extends transversely between the uprights 18 and is attached thereto by suitable means such as bolts 102.

A modified form of the leaves which make up the conveying band is illustrated at 104 in FIGS. 10 and 11. The modified leaf 104 has a circular aperture 106 and an elongate aperture 108 for receiving the transverse rods 62. Each of the leaves 104 has an offset portion 110. The purpose of the offset portion is to maintain a spacing between adjacent leaves, thereby permitting elimination of the previously described spacers 72.

In operation, the improved dual bend conveyor of the present invention has several advantages over other conveying systems of this type. One of these advantages is the uniformity of wear of the multiple leaves 60 which form the continuous conveying surface. As seen in FIG. 8, the bottom surfaces 104 of the leaves 60 are in engagement with the supporting ways 20 and 92 of the upper conveyor runs. In the return run as seen in FIG. 9, the lower surfaces 104 are not in engagement or sliding friction with the supporting way 22 but rather the upper surfaces of the conveying band 106 are subjected to sliding friction therefore tending to equalize the wear on both sides of the leaves 60. Another important feature of the invention is the fact that the drive and guide chain 32 alone is subjected to the substantial tension and frictional forces associated with driving the conveyor or roller chain. However, it is to be noted that the conveying band is comprised of the multiple leaves 60 and transverse rods 62 must be stressed only to withstand the forces of friction with the ways and the weight of the articles to be conveyed and is not subjected to the tension required to drive the conveyor. Another important feature of the invention is the manner in which the transverse rods and leaves 60 are mounted in the roller links of the guide and drive chain 32. As previously described in connection with FIGS. 3 and 5, these rods and links are loosely mounted so that the rods may rotate about their longitudinal axes as well as slide transversely through the links and mounting tabs 64 of the inside roller link plates. This particular manner of mounting in addition to providing flexibility for longitudinal and vertical bending of the conveyor chain, enables smoother operation of the conveyor, especially in lateral bends. This smoother operation is attributed to the fact that the transverse pins being slidably mounted to the chain transmit no or little shifting motion due to any irregularities in the chain guides 86 and reduce transmission of any vibration of any lateral forces between the leaves 60 and the drive chain 32.

Another advantage of the present conveyor is its feature of being centrally driven. This feature eliminates any tipping or lifting tendency of the outside portion of the chain and lateral bends due to inequal tension between the inside and outside portions of the conveying surface.

Although the best mode contemplated for carrying out the present invention has been herein shown and described, it will be apparent that modification and variation may be made without departing from what is regarded to be the subject matter of the invention.

What we claim is:

1. An endless conveyor of the type having a generally flat, doubly articulated conveying band and a doubly articulated drive chain connected to said band; the improvement wherein said drive chain is a roller chain of the type having pin links pivotally connected to roller links for engagement with sprockets disposed normally to said band, means at said pivotal connections for also providing chain articulation in the plane of said band, brackets projecting oppositely from one set of alternate links, rollers mounted in said brackets about axes normal to the plane of said band for engagement with sprockets disposed parallel to the band, and means on the other set of alternate links for mounting said band.

2. The conveyor of claim 1, wherein said means for providing chain articulation in the plane of said band comprises doubly tapered pins in said pin links.

3. The conveyor of claim 1, wherein said conveying band comprises multiple transverse rods mounted in projections on the roller links, multiple leaves forming a continuous conveying surface between said rods, and means for mounting said leaves between said rods to permit relative movement between said rods and leaves when said conveyor is subjected to horizontal and lateral bends.

4. An endless conveyor to be driven by sprocket means parallel and normal to the conveyor comprising; a doubly articulated drive chain which is flexible in horizontal and vertical planes; a continuous flexible conveying band, said chain having link plates with projections for mounting said conveying band, said chain includes roller means mounted on said link plates for engagement with said sprocket means normal to said conveyor, said chain further including connecting links having roller means for engagement with said sprocket means parallel to said conveyor; said conveying band comprising multiple transverse rods mounted in the link plate projections, multiple leaves forming a continuous conveying surface between said rods, and means for mounting said leaves between said rods to permit relative movement between said rods and leaves when said conveyor is subjected to horizontal and lateral bends.

5. The conveyor of claim 4, wherein said conveyor further comprises conveyor band supporting ways, and guide rails, said connecting link roller means and said guide rails cooperate to guide and support said conveyor.

6. The conveyor of claim 4 wherein each of said leaves includes an offset portion for maintaining a lateral space between said leaves.

* * * * *